United States Patent [19]

Yakel

[11] 4,338,496

[45] Jul. 6, 1982

[54] TESTING FACILITY FOR TELEPHONE CONFERENCE BRIDGE

[75] Inventor: Alfred W. Yakel, Edmond, Okla.

[73] Assignee: Keltronics Corporation, Oklahoma City, Okla.

[21] Appl. No.: 265,144

[22] Filed: May 19, 1981

[51] Int. Cl.³ .............................................. H04M 5/00
[52] U.S. Cl. .............................................. 179/175.1 R
[58] Field of Search .............. 179/91 A, 18 AD, 37, 179/175.1 R, 175, 175.21, 175.23, 175.25, 1 PC, 1 CN, 18 BC

[56] References Cited

U.S. PATENT DOCUMENTS 2,237,666  4/1941  Hanson et al. ............... 179/175.1 R
3,699,284 10/1972  Anderson ..................... 179/175.1 R Primary Examiner—Thomas A. Robinson
Attorney, Agent, or Firm—Harvey B. Jacobson

[57] ABSTRACT

A passive conference bridge is coupled to telephone lines through pairs of panel mounted plug-in jacks to establish conference call connections with balanced input/output impedances. Test equipment is plugged into the jacks for connection to the bridge circuit and/or telephone lines. The telephone lines are disconnected from a leg of the bridge circuit through one of the jacks of each pair and a terminating resistor is thereby inserted into the disconnected bridge leg.

13 Claims, 8 Drawing Figures

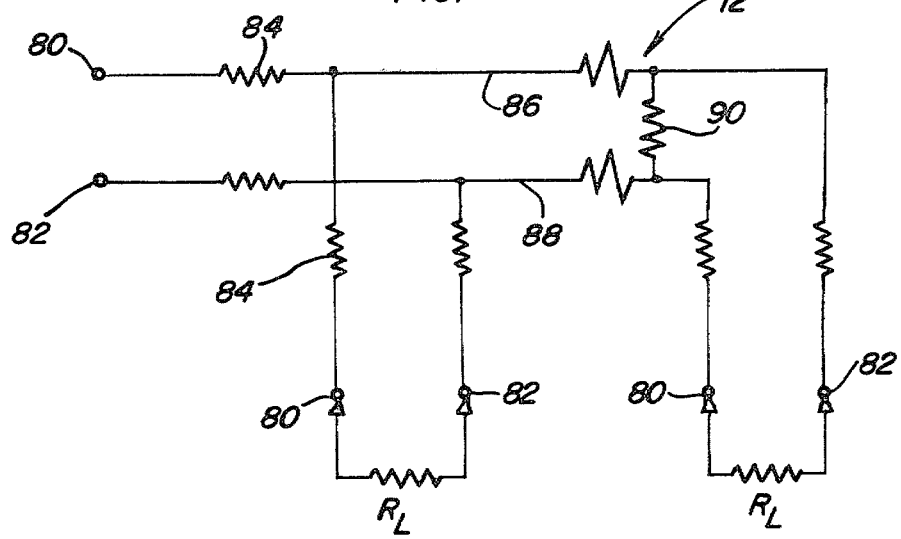
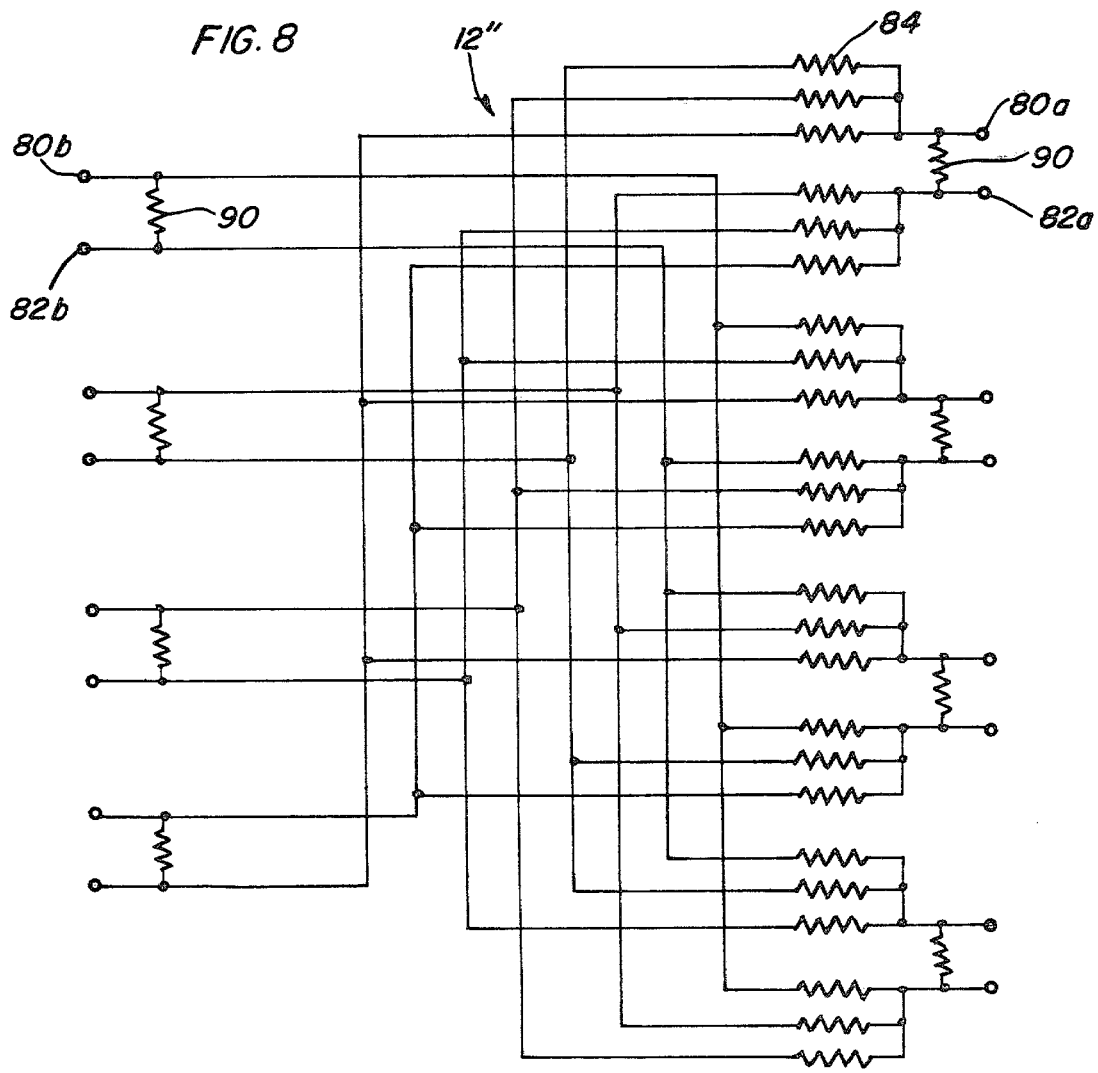

4,338,496

TESTING FACILITY FOR TELEPHONE CONFERENCE BRIDGE

BACKGROUND OF THE INVENTION

This invention relates to the testing of telephone systems in general and more particularly to the testing of conference bridges associated with telephone communication systems.

The present invention is directed to the testing of resistive types of conference bridges which are passive networks of resistors, as distinguished from active conference bridges which include amplifiers and other signal treating devices. The passive type of conference bridge, which is generally well known in the art, is utilized for interconnecting telephone lines or trunks in order to provide telephone conference connections and may or may not be connected to external amplifiers or attenuators. Such resistive bridges are generally arranged to provide equal input and output impedances, generally 600 ohms, and are usually in the form of printed circuit cards inserted into prewired rack assemblies mounted as part of frame mounting terminal blocks in common use in the telephone industry. Such "bridge blocks" are mounted on telephone office frame assemblies and wired into appropriate network trunk lines. In large central offices, several hundreds of such bridge blocks are often mounted in rows on the frames.

The aforementioned conference circuits are utilized extensively for both voice and data applications. Mismatch of impedances, unacceptable levels of cross talk in adjacent lines, significant impairment due to phase delays, line outages, uneven levels of gain or attenuation due to line routing discrepancies, etc., all tend to increase the complexity and cost of providing quality service with reduced downtime. Also, the current growth of conference call connections and interconnection of conference circuits has created operational and service problems that require the use of test equipment for troubleshooting and fault location. The testing procedure is, however, costly and time consuming because of the complexity of conference circuits involved. For example, it is often necessary to locate faults internally within a resistive bridge, such as a burnt out resistor or cold solder joint. More often, however, the fault is external to the bridge on a telephone line connected thereto. In order to check either a conference bridge itself or associated network line, the suspected circuit was heretofore isolated and disconnected from the line. This procedure has involved unsoldering leads from the bridge block in order to tie in or clip on the leads of various test equipment. Because of the close proximity of many connecting points on the terminal block, adjacent circuits are sometime inadvertently shorted out to pose a critical problem in connection with differential data circuits.

It is therefore an important object of the present invention to provide apparatus associated with passive conference bridges through which fault testing may be facilitated and performed without the aforementioned drawbacks.

Another object is to provide a telephone conference bridge circuit that is easy to install and service.

SUMMARY OF THE INVENTION

In accordance with the present invention, standard resistive bridges mounted on a printed circuit board are incorporated within a panel assembly, the front of which mounts a plurality of plug-in jack devices so arranged and interconnected as to accommodate the use of testing apparatus for the bridge circuit and/or line.

In accordance with one aspect of the present invention, two plug-in jacks are associated with each impedance leg of a bridge circuit and the associated network lines. Insertion of a mating jack plug into one of the jacks of a pair disconnects the bridge leg from the network lines associated therewith and at the same time couples the network lines to the testing equipment. Insertion of a mating jack plug into the other jack of the pair connects the test equipment to both the bridge circuit and the telephone lines in parallel. Each pair of jacks is arranged to automatically connect a standby terminating resistor across the bridge circuit leg when disconnected from the network lines.

The bridge circuits mounted on the printed circuit board are connected directly to the bridge monitoring jack assembly through multi-wire cables. The input or output terminals of the bridge circuits are thereby directly wired through the bridge monitoring jacks to terminals of the line monitoring jacks. Thus, when the jack assemblies are inactive, the bridge circuits are electrically connected to the external network lines through connecting cable terminals mounted on the rear of the panel housing in which the jack assemblies and bridge circuit boards are mounted.

The mounting of the aforementioned jack assemblies, bridge circuit boards and terminals in the panel housing provides for ready removability or replacement in order to accommodate any combination of two-wire or four-wire bridges for any given number of conference connections. Each passive bridge will exhibit an insertion loss, the amount of which will depend upon the particular bridge circuit configuration. Circuit boards mounting different bridge circuits may therefore be provided, all of which are designed to maintain a predetermined balanced input/output impedance relationship. The bridge circuit may be provided with additional insertion loss resistors to increase normal insertion loss as a function of the number of line connections thereby eliminating the need for external attenuation.

According to another feature of the present invention, adjacent legs of a bridge circuit of the two-wire type, are connected to alternately spaced jacks on the jack panel rather than consecutive adjacent jacks. With such an arrangement, a four-wire bridge circuit may be utilized by employing double pronged plugs from the test equipment inserted into adjacent jacks to which a four-wire printed circuit board is connected.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIGS. 7 and 8 are circuit diagrams of modified bridge circuits in accordance with the present invention.

DETAILED DESCRIPTION OF PREFERRED EMBODIMENT

Figure 1:
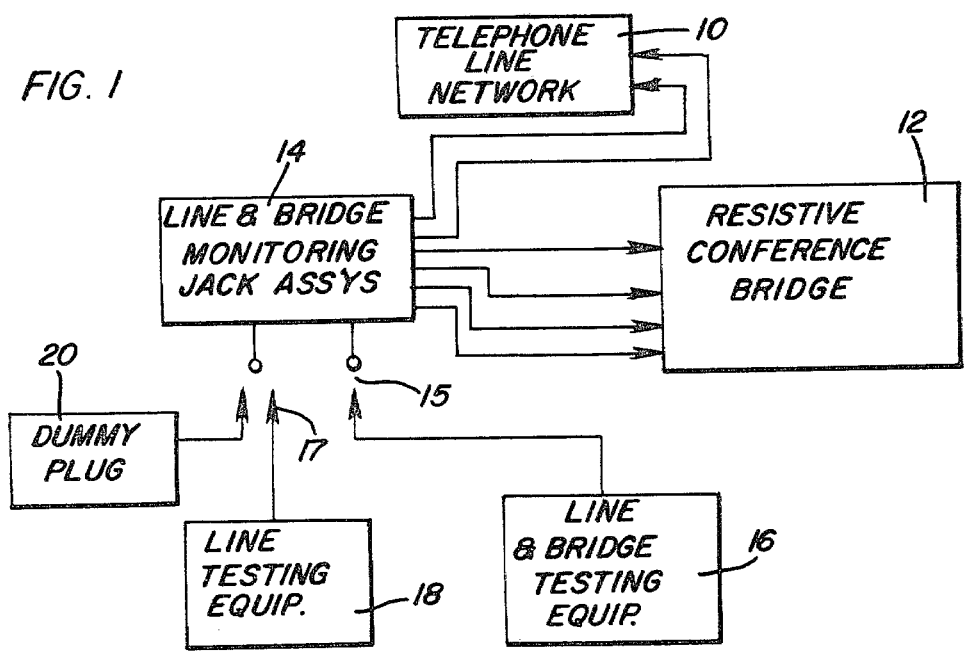
FIG. 1 is a schematic block diagram illustrating the installation and use of the present invention.

Referring now to the drawings in detail, FIG. 1 illustrates a telephone line network, generally referred to by reference numeral 10, through which conference calls are established as already well known in the art. In order to establish equal input and output impedances when three or more network lines are interconnected to provide a telephone conference connection, a resistive conference bridge circuit, generally referred to by reference numeral 12, is connected to the network lines through an array of jack assemblies 14, in accordance with the present invention. The connections established by the jack assemblies 14 facilitate the testing and analysis of faults and other problems that arise both internally within the bridge circuit 12 and in the associated telephone network lines 10. As shown in FIG. 1, testing of the line and bridge may be accomplished by insertion of plugs 15 of testing equipment 16. Testing of the line alone through test equipment 18 may be accomplished independently of any bridge testing through plug 17. Insertion of a dummy plug 20 into the jack assemblies 14 also disconnects legs of the bridge circuit from the associated network lines.

The resistive conference bridge circuit shown in FIG. 1 is a passive network of fixed value resistors connected in series parallel circuit through which two or more network lines or trunks are interconnected to provide a conference call as is already well known in the art. The values of the resistors and the circuit connections are so chosen as to yield input and output impedances of generally 600 ohms. Additionally, the values of the resistors are so chosen as to yield a known fixed value insertion loss, the amount of which varies in dependence on the bridge circuit configuration. Resistive bridge circuits are often designed with either two-wire or four-wire inputs and with any desired number of conference connections. The amount of insertion loss is a direct function of the number of conference connections associated with the bridge. It is common practice to have two or more identical, but electrically separate bridge circuits, mounted on the same mounting block and the same bridge may be utilized as a splitter or as a concentrator depending on requirements.

Figure 2:
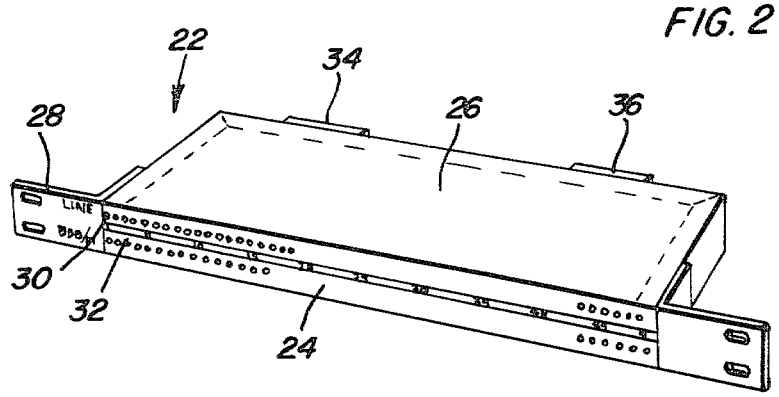
FIG. 2 is a perspective view illustrating a typical conference bridge unit construction in accordance with the present invention.
Figure 3:
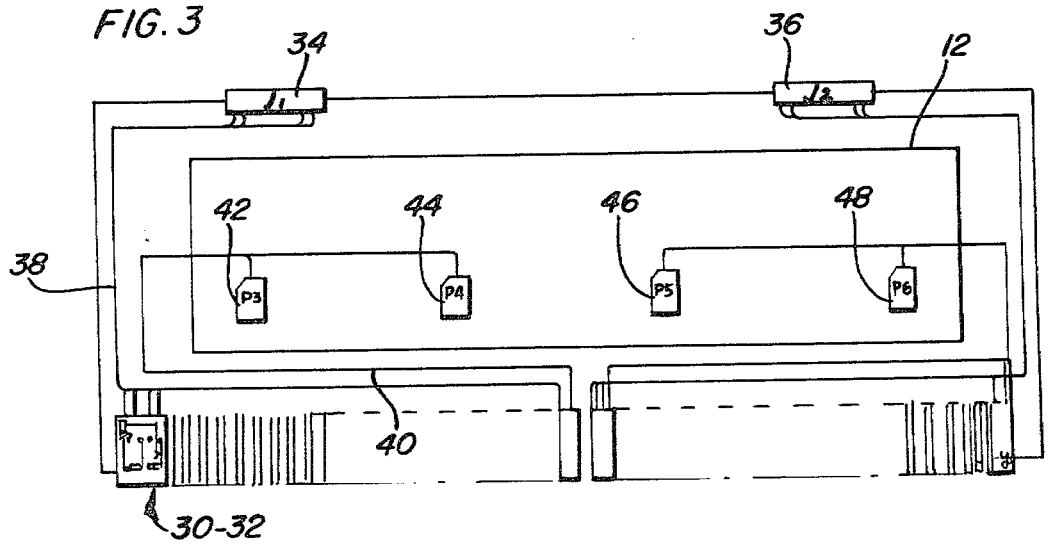
FIG. 3 is a wire cable layout diagram corresponding to the unit illustrated in FIG. 2.

FIG. 2 illustrates a typical conference bridge unit constructed in accordance with the present invention and referred to by reference numeral 22. The unit 22 incorporates and mounts therein both the jack assemblies 14 and the conference bridge circuit 12 as described with respect to FIG. 1. The bridge unit 22 includes a front panel 24 of a housing 26 to which a pair of mounting brackets 28 are secured. The jack assemblies are exposed on the front panel 24 for ready access of test equipment through conventional plugs 15 and 17. For a two-wire type of bridge, a pair of cable terminals 34 and 36 are mounted on the rear side of the housing 26 opposite the front panel 24 through which the telephone network lines are coupled to the conference bridge circuit mounted internally within the housing 26. As shown in FIG. 3, the network line terminals 34 and 36 are wired to the pairs of jacks 30 and 32 by multi-conductor cables 38 while a multi-conductor cable 40 wires the jack pairs to circuit junctions 42, 44, 46 and 48 associated with the conference bridge circuit 12.

Figure 4:
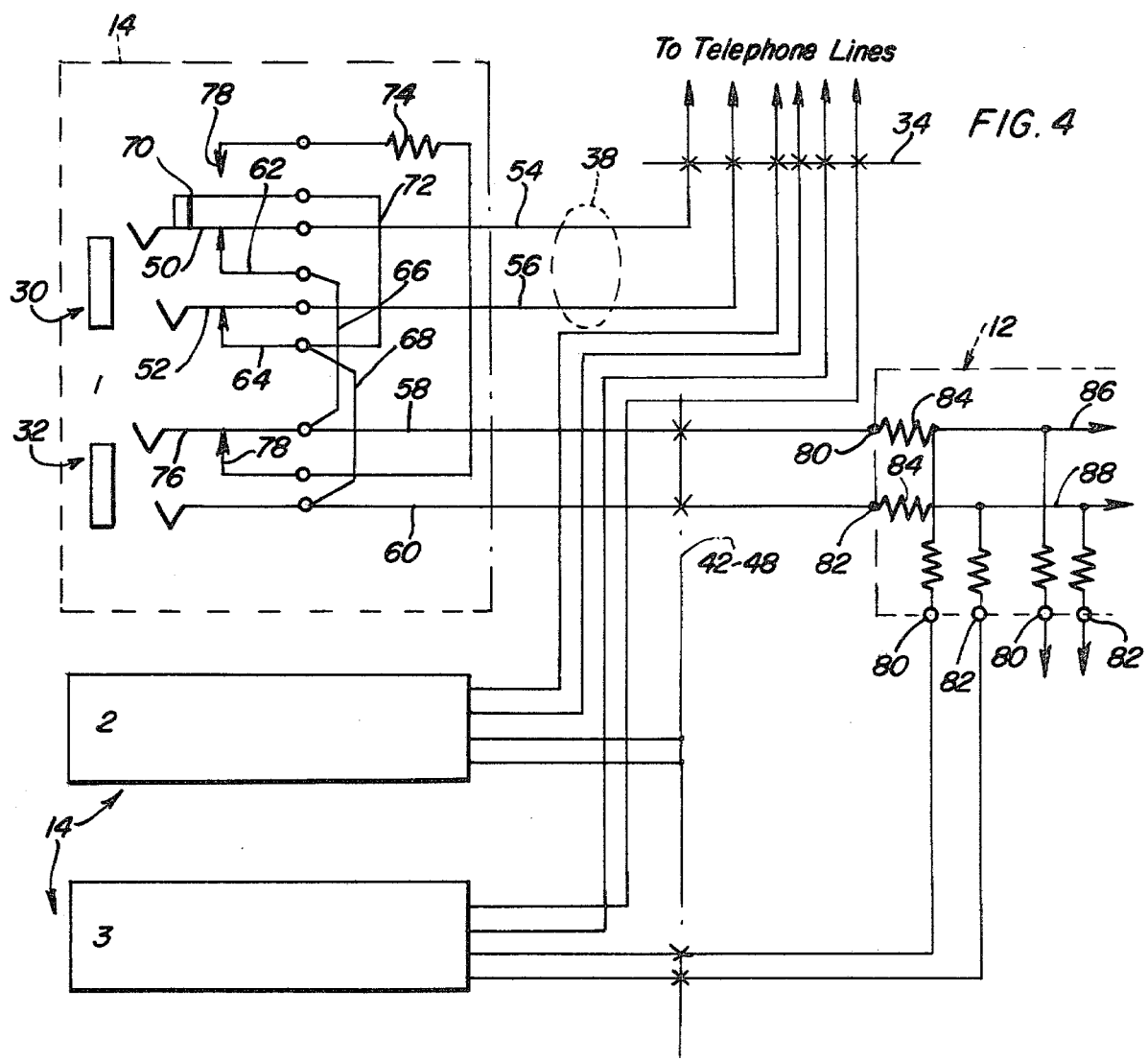
FIG. 4 is an electrical circuit diagram illustrating a portion of the circuitry associated with the conference bridge circuit unit shown in FIGS. 2 and 3.
Figure 5:
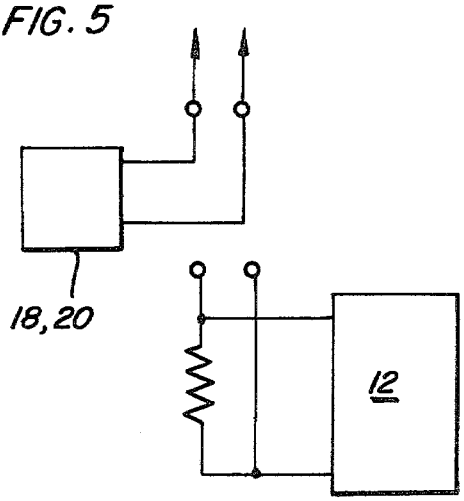
FIG. 5 is a schematic block diagram illustrating the network line monitoring function of the present invention.
Figure 6:
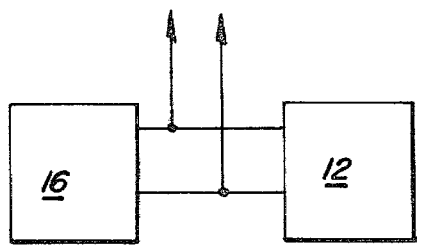
FIG. 6 is a schematic block diagram illustrating the bridge circuit monitoring function.

Referring now to FIG. 4, the circuit associated with the jack assemblies 14 is shown. Each jack assembly includes the jack 30 through which the line monitoring function is accomplished and the jack 32 through which a bridge and line monitoring function is accomplished. The jack 30 includes a pair of movable switch elements 50 and 52 that are displaced from the normal positions shown, in response to insertion of a dummy plug 20 or a plug 17 from line testing equipment 18, as indicated with respect to FIG. 1. In the normal positions of the switch elements 50 and 52 as shown, electrical connections are established from the telephone lines through conductors 54 and 56 forming part of the multi-conductor cable 38 to the bridge leg conductors 58 and 60 forming part of the multi-conductor cable 40 as aforementioned in connection with FIG. 3. Such normal electrical connections are established by the switch elements 50 and 52 through stationary contacts 62 and 64 and connector wires 66 and 68. It will be apparent that when the switch elements 50 and 52 are displaced from engagement with the fixed contacts 60 and 62 by insertion of a plug, the telephone line conductors 54 and 56 are disconnected from the bridge leg conductors 58 and 60. At the same time, an electrical connection is established through switch element 70, connecting wire 72 and connecting wire 68 across the bridge leg conductors 58 and 60 through a terminating resistor 74 so as to replace the impedance of the associated network lines. Such activated condition of the jack 30 is shown in FIG. 5.

In the normal position of the line and bridge monitoring jack 32 associated with each jack assembly 14, a movable switch element 76 is engaged with a fixed contact 78 connected to one end of the terminating resistor 74, the other end being connected to the normally disengaged contact 78 associated with the jack 30. Thus, as long as the jack 32 is inactive, the terminating resistor 74 may be connected across the bridge leg conductors 58 and 60 when the jack 30 is activated as aforementioned. When the jack 32 is activated, however, no connection of the terminating resistor 74 to the bridge leg is possible since the switch element 76 is disengaged from fixed contact 78 to disable any connection of the terminating resistor 74. The connection of the bridge leg conductors 58 and 60 to the telephone lines remains undisturbed when the jack 32 is activated so that an electrical connection may be established through the plug 17 of the test equipment with both the telephone lines and the bridge circuit in parallel.

In FIG. 4, the bridge circuit 12 is shown to be of the type through which a plurality (N) of two-wire telephone line connections are normally established by the jack assemblies 14 at each of the circuit terminal connectors consisting of a pair of tip and ring terminals 80 and 82. The terminals 80 and 82 are respectively connected by fixed coupling resistors 84 to parallel connecting lines 86 and 88 to which all of the other connector terminals are coupled by the same resistors in order to establish a bridge insertion loss impedance. The resistive values of resistors 84 determining the normal bridge insertion loss (dB) is selected in order to obtain a bridge input impedance at an input connector matching the output impedance which depends on the impedances of the loads (RL) connected to all of the other circuit terminal connectors. For a two-wire, six connection type of bridge circuit having a balanced 600 ohm impedance, the normal insertion loss is 13.98 dB, for example.

FIG. 7 shows a two-wire bridge circuit 12' which is the same as bridge circuit 12, except for the provision of additional fixed resistor 90 connected across the bridge circuit. The additional insertion loss introduced by resistor 90 together with the insertion loss of coupling resistors 84 are arranged to maintain a matched input impedance for the bridge circuit. By use of bridge circuit 12', the need for external alternators in many carrier-to-carrier network conferencing installations is eliminated.

From an analysis of the bridge circuit 12' shown in FIG. 7, the resistive values (R) and (r) of resistors 90 and 84 may be calculated from the following derived equations:

$$R = \frac{RL\,[1 + K(N-1)]}{1 - K(N-1)} \quad (1)$$

$$r = \frac{RL\,[1 + K(N-1)](1-K)}{4NK} \quad (2)$$

$$\text{where } K = 10^{\frac{-dB}{20}} \text{ (insertion loss)} \quad (3)$$

Thus, the circuit 12' exhibits an insertion loss that is a function of the number (N) of telephone line connections being serviced and is greater than the normal insertion loss for circuit 12. If resistor 90 were eliminated, then R=00 and equation (1) becomes K=(1)/(N−1). Therefore, K must be equal to or less than (1)/(N−1). For a two-wire, six-way bridge circuit 12', an insertion loss of 23.0 dB is provided by way of example, as a standard.

FIG. 8 illustrates application of the increased insertion loss bridge concept to a four-wire telephone installation. Thus, the balanced bridge circuit 12" shown in FIG. 8, includes four terminal connectors, each of which consists of four terminals 80a, 80b, 82a and 82b. Resistors 90 are connected across each pair of terminals 80a-82a and 80b-82b. Three coupling resistors 84 connect each terminal 80a and 82a in parallel to three of eight connecting lines to which the terminals 80b and 82b are directly connected.

The resistive values of resistors 90 and 84 may be calculated from the following derived equations:

$$R = RL\left[\frac{1 - K^2(N-1)}{1 - 2K(N-1) + K^2(N-1)}\right]$$

$$r = RL\left[\frac{1 + K^2(N-1)}{4K}\right], \text{ where the insertion}$$

$$\text{loss } K = 10^{\frac{-dB}{20}},\ K \leq \sqrt{\frac{N}{N-1}} - 1$$

By way of example, for a specified insertion loss (dB) of 15, the foregoing equations are utilized to calculate the resistance R−19464.72 ohms and r=763.49 ohms.

Although the embodiment of the invention as depicted in FIGS. 2 and 3 is designed for two-wire bridge circuits, adjacent legs of the bridge circuit are connected through the terminals 80 and 82 thereof to alternately spaced jack assemblies as shown in FIG. 4. In this manner, the unused jack assemblies will be available for connection to the other pair of terminals of a four-wire bridge circuit. Double pronged plugs from the test equipment are inserted into adjacent jacks for testing purposes in such case. A four-wire printed circuit board will accordingly replace the two-wire circuit printed boards otherwise mounted within the housing 26.

According to another feature of the invention, a bridge unit having a certain number of jack assemblies may be used to service less than that number of conference connections by merely inserting dummy plugs into the unused jack assemblies. This is possible because insertion of dummy plugs into a jack assembly disconnects the bridge circuit from the jack terminals as hereinbefore described.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a passive bridge circuit having impedance legs through which conference call connections are established between associated network lines of a telephone communication system, apparatus for connecting said bridge circuit to the network lines while facilitating testing thereof by test equipment, comprising a housing internally mounting the bridge circuit, and a plurality of plug-in jack devices mounted in the housing for interconnecting the bridge circuit and the network lines, each of said jack devices including insertion activated means for alternatively connecting the test equipment to one of the legs of the bridge circuit in parallel with the network lines associated therewith and disconnecting said one of the legs from the associated network lines.

2. The combination of claim 1, wherein each of said jack devices further includes a terminating resistor, and means for connecting the resistor to said one of the impedance legs of the bridge circuit in response to said disconnection thereof from the associated network lines.

3. The combination of claim 2, wherein each of said jack devices further includes a pair of monitoring switch means respectively activated to disconnect the network lines and disable the connection of the terminating resistor to said one of the legs of the bridge circuit.

4. The combination of claim 3, wherein said housing includes a plug-in panel through which the jack devices are exposed in spaced relation to each other, said legs of the bridge circuit being connected to alternate ones of said jack devices, said bridge circuit being of the two-wire type.

5. The combination of claim 1, wherein said housing includes a plug-in panel through which the jack devices are exposed in spaced relation to each other, said legs of the bridge circuit being connected to alternate ones of said jack devices, said bridge circuit being of the two-wire type.

6. For use with a passive bridge circuit adapted to be connected to telephone lines for equalizing input/output impedances of conference call connections, and means for testing the bridge circuit and the lines through insertion plugs, the improvement comprising a plurality of jack devices normally establishing connections between the bridge circuit and the telephone lines, and means mounting the jack devices in spaced relation to each other for reception of the insertion plugs of the testing means to connect the same to the lines and the bridge circuit.

7. The improvement as defined in claim 6, including terminating resistor means and means responsive to connection of the testing means to the telephone lines alone for connecting the terminating resistor means to the bridge circuit.

8. The improvement as defined in claim 7, wherein each of the jack devices includes a pair of switches respectively activated by the insertion plugs to disconnect the telephone lines from the bridge circuit and disable the connection of the terminating resistor means.

9. The improvement as defined in claim 6 wherein said bridge circuit comprises a predetermined number (N) of multi-wire connectors each having at least one pair of terminals through which the jack devices establish said connections to the telephone lines, resistive means connected to said connectors for establishing a normal bridge circuit insertion loss (dB), and additional resistor means connected across each of said pairs of terminals for increasing the insertion loss as a function of the predetermined number (N) of connectors.

10. The improvement as defined in claim 9 wherein said resistive means and said additional resistor means have resistance values (R and r) that are functions of said predetermined number (N) of connectors necessary to establish input and output impedance balance.

11. For use in a telephone conference bridge circuit having a predetermined number (N) of multi-wire connectors each provided with at least one pair of terminals, and resistive means connected to said connectors for establishing a normal bridge circuit insertion loss (dB), the improvement comprising additional resistor means connected across each of said pairs of terminals for increasing the insertion loss as a function of the predetermined number (N) of connectors, said resistive means and said additional resistor means having resistance values (R and r) that are functions of said predetermined number (N) of connectors necessary to establish input and output impedance balance.

12. The improvement as defined in claim 11 wherein the total insertion loss is less than $1/N-1$ for a six way bridge circuit.

13. The improvement as defined in claim 11 wherein the total insertion loss for a four-wire bridge circuit is less than $\sqrt{(N)}/(N-1)-1$.

* * * * *